(12) United States Patent
Ros Roca

(10) Patent No.: US 7,913,855 B2
(45) Date of Patent: Mar. 29, 2011

(54) SELF-CLEANING FILTER FOR AGRICULTURAL IRRIGATION WATER

(76) Inventor: Salvador Ros Roca, Roldan (ES)

( * ) Notice: Subject to any disclaimer, the term of this patent is extended or adjusted under 35 U.S.C. 154(b) by 55 days.

(21) Appl. No.: 11/813,348

(22) PCT Filed: Nov. 18, 2005

(86) PCT No.: PCT/ES2005/000630
§ 371 (c)(1),
(2), (4) Date: Jan. 14, 2009

(87) PCT Pub. No.: WO2006/072642
PCT Pub. Date: Jul. 13, 2006

(65) Prior Publication Data
US 2009/0120866 A1    May 14, 2009

(30) Foreign Application Priority Data
Apr. 1, 2005   (ES) ................. 200500010 U

(51) Int. Cl.
*B01D 29/68* (2006.01)
*B01D 29/46* (2006.01)
*B01D 29/74* (2006.01)

(52) U.S. Cl. ......... 210/411; 210/352; 210/354; 210/488
(58) Field of Classification Search .............. 210/411, 210/488, 352, 354
See application file for complete search history.

(56) References Cited

U.S. PATENT DOCUMENTS

| | | | | |
|---|---|---|---|---|
| 4,655,910 A | * | 4/1987 | Tabor ............ | 210/107 |
| 4,655,911 A | * | 4/1987 | Tabor ............ | 210/107 |
| 6,419,826 B1 | * | 7/2002 | Lara et al. ...... | 210/304 |
| 2006/0144768 A1 | * | 7/2006 | Harris ........... | 210/106 |

* cited by examiner

*Primary Examiner* — Thomas M Lithgow
(74) *Attorney, Agent, or Firm* — Sanchelima & Associates, P.A.

(57) ABSTRACT

The invention relates to an improved self-cleaning filter for agricultural irrigation water having a support base (8) for the rings (3) traversed by perforated tubes (4) which clean them, allowing the axial movement of the tubes (4) having an integral upper cover (5) at the opposite end which presses them in an axial direction, whereas the lower base (6), also integral thereto, generates the axial thrust to separate and press them, acting as a blocker and allowing the flow path to the perforated tubes (4); incorporating a base (9) acting as a membrane and a spring pressing on the rings (3), with an adjustable separation and variable in number.

3 Claims, 2 Drawing Sheets

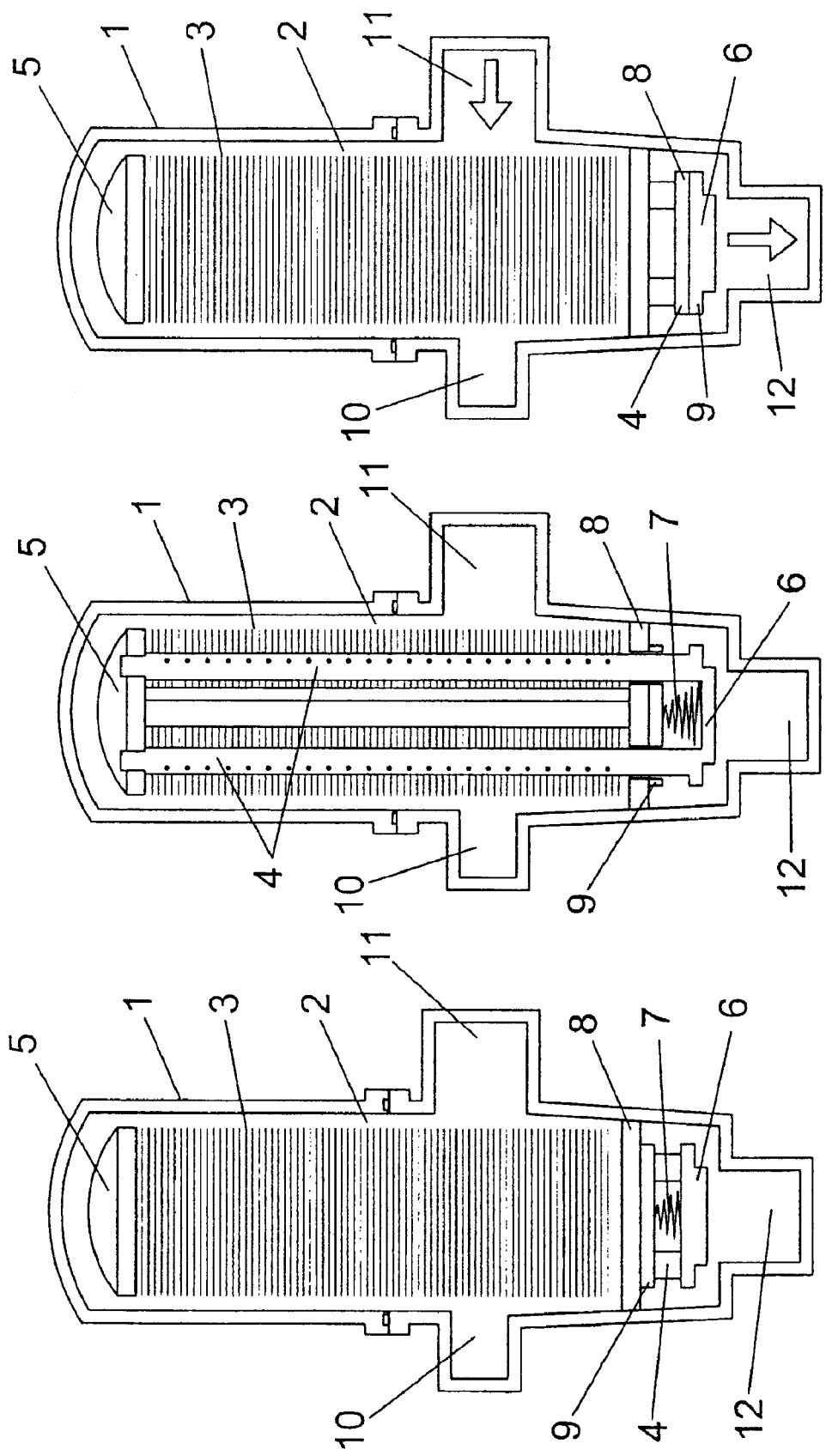

US 7,913,855 B2

SELF-CLEANING FILTER FOR AGRICULTURAL IRRIGATION WATER

OBJECT OF THE INVENTION

This specification relates to an improved self-cleaning filter for agricultural irrigation water, in which a series of improvements have been introduced in self-cleaning filters intended for cleaning water, in which the self-cleaning process is carried out by means of temporary reversal of the direction of the flow of water traversing it, reducing water consumption due to the cleaning operations, periodic maintenance operations, manual cleaning and high manufacture costs.

FIELD OF THE INVENTION

This invention is related to filters for water, and more specifically for irrigation water.

BACKGROUND OF THE INVENTION

In self-cleaning filters, the state of the art has experienced fast growth in recent years essentially due to the development of their use in irrigation applications.

The entire professional sector is aware of the advancement made for the purpose of making better use of water resources, especially in regions having natural water shortages, and in this sense drip irrigation and micro-sprinkler irrigation can be mentioned as examples of the aforementioned techniques.

All these modern techniques achieve a high degree of efficiency with utilization of water, and in addition, it is also obvious that the utilization of lower-quality water is becoming increasingly frequent, and this operation frequently implies using water with impurities which, though not constituting a drawback for traditional irrigation techniques, they can be a serious problem in drip and micro-sprinkler irrigation installations.

Due to the foregoing, it is necessary to place filters which prevent, as much as possible, impurities entrained by the flow of water from reaching the mentioned drip and micro-sprinkler irrigation installations.

The subsequent problem with the use of filters results from the necessary cleaning and maintenance operations associated with their operation to eliminate impurities accumulated therein.

In relation to the foregoing, it must be indicated that self-cleaning filters have been known and used for a long time in which two coaxial chambers are arranged inside a substantially cylindrical casing, one chamber being perimetral and the other axial, connected together through a plurality of filtering discs provided with grooves on their faces, which grooves are sometimes radial and other times oblique, such that when these discs are placed one on the other, the mentioned grooves become low-caliber conduits, affording these filters the filtering effect.

In this type of filters, the chamber, encasing or exterior is coupled to the corresponding, generally radial, water inlet, whereas the axial chamber is in turn connected to the filtered water outlet pipe, generally axially arranged, such that the duly pressurized water first reaches the perimetral chamber so that through the discs it reaches the axial chamber, causing the filtration thereof, and finally leaves the filter through the axial outlet thereof.

The mentioned filtering conduits obviously collect dirt and over time, and it is necessary to periodically wash or clean them, for which purpose the operation of reversing the water flow direction is also known such that clean water penetrates through the inlet that was once the outlet pipe, passes between the discs and entrains the dirt deposited therein to what is normally the inlet opening.

It is also known that to facilitate this operation, the discs are separated during the self-cleaning operation to facilitate the release and entrainment of dirt located on their surface.

By knowing the operations and processes which make the reversal of the flow of water traversing it for cleaning, the water passage is closed, allowing it to pass only through perforated pipes acting on the rings and making them rotate due to the orientation of the holes, this operation facilitating the expulsion of particles.

The flow reversal is also known by means of a three-way valve coupled at the water inlet into the filter.

This particularity means that these filters are widely used, essentially in countries where the cost of manual labor needed for cleaning the filter is high, those installations having self-cleaning filters therefore being preferred.

However, this structure involves wide-spread and varied drawbacks, basically focused on the following aspects, namely:

During the cleaning or self-washing phase, the water passage is closed, allowing the water to pass only through the perforated pipes, the filter being forced to clean the rings by means of pressure jets, which causes very little particle entrainment rate, making it difficult for all the particles to exit.

In water with a high degree of particles in suspension, the number of necessary cleanings is very high due to the previously mentioned fact that the entire cleaning of the particles in suspension is not carried out, causing water expenditure to be greater than needed.

When the particles in the water are lightweight or floating matter, such as alga residue for example, the cleanings are more complicated due to the previously mentioned fact that there is no cleaning flow rate, and accordingly the flow rate is lower in the entire cleaning phase, which forces using more water to shorten cleaning operations.

Due to the complexity of the mechanisms used in these self-cleaning filters, they require high maintenance control for their operation and therefore a periodically added cost.

The structure of the components of these filters and the many parts, gaskets and different accessories make manufacture expensive and therefore means the filters are used less frequently by users.

The present invention's solution to the drawbacks existing today in this field would be to have a self-cleaning filter for agricultural irrigation water in which the self-cleaning is carried out by means of the temporary reversal of the flow of water going through it, reducing consumption of the water used in these maintenance operations.

However, the applicant is not aware of the current existence of an invention having the features described in this specification.

DESCRIPTION OF THE INVENTION

The improved self-cleaning filter for agricultural irrigation water solves in a fully satisfactory manner the aforementioned drawbacks.

Specifically, the self-cleaning filter for agricultural irrigation water object of the invention has a basic structure, similar to other filters of this type, formed by an outer chamber coupled to the water inlet, inside which chamber there is an axial chamber communicating with the outlet conduit or outlet, both chambers being defined by a disc or ring frame and the inner chamber being formed by the inside of the filtering rings or discs.

One of the features of the present filter includes incorporating an outlet for the water in the cleaning mode in the outer chamber regardless of the chamber or opening used as an inlet into the filter. This outlet makes it possible to carry out a pre-cleaning of the rings at a higher flow circulating rate for their cleaning, completely eliminating the particles in suspension, first by opening the newly incorporated outlet, the water entering the filter manages to sweep away the largest particles adhered to the rings in the outer part thereof and in little time; the water inlet into the filter is closed, which causes the flow to be reversed (by using a three-way valve), cleaning the inner part of the rings by means of the water coming from the perforated pipes.

This filter substantially differs from filters used today in that it has the possibility of closing itself by upon the reversal of the flow, managing to make the water pass only by means of the perforated pipes and at the same time the rings are separated, these two effects being dependent on one another in accordance with a base on which the rings rest, forming the packet that is internally traversed by four pipes forming the rack of the rings, which are supported in these pipes and such pipes end in their upper part in a circular part functioning as an upper plug for the rings, which plug has an outer diameter that is similar to that of the rings which the four pipes are removably secured to.

In the other lower part of the pipes, the latter pass through the base by means of holes that are larger than the diameter of the pipes for the purpose of obtaining free movement and these pipes end in a circular part or end base that leaves the orifices at the end of the pipes free. The end base is fixed to such pipes.

The entire invention, by default, presses against the rings by means of a spring located in the lower part or base of the rings, forming the self-closing means.

In summary, this filter lacks gaskets and membranes or any other means causing periodical maintenance and results in low manufacturing cost due to minimum use of parts.

DESCRIPTION OF THE DRAWINGS

To complement the description being made and for the purpose of aiding to better understand the features of the invention, a set of drawings is attached to the present specification as an integral part thereof in which, with an illustrative and non-limiting nature, the following has been shown:

FIG. 1 shows a partially sectioned, side elevational view of the object of the invention corresponding to an improved self-cleaning filter for agricultural irrigation water in the stand-by position.

FIG. 2 shows a sectioned view in the same position as the object shown in FIG. 1.

FIG. 3 shows a view of the object shown in FIG. 1 in the filtering position.

PREFERRED EMBODIMENT OF THE INVENTION

Figure 4:
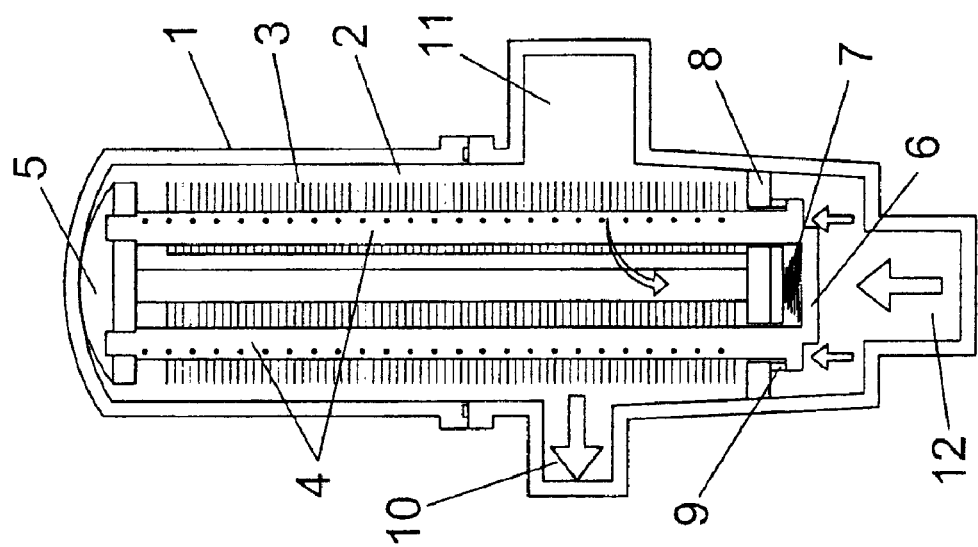
FIG. 4 shows a sectioned view of the object in the same position as that shown in FIG. 3.
Figure 5:
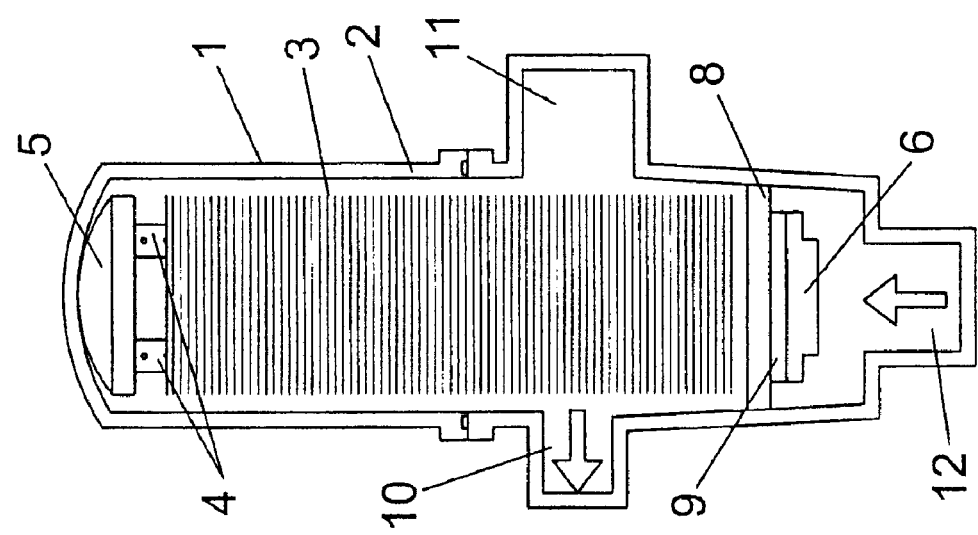
FIG. 5 shows a view of the object shown in FIG. 1 in the cleaning position.
Figure 6:
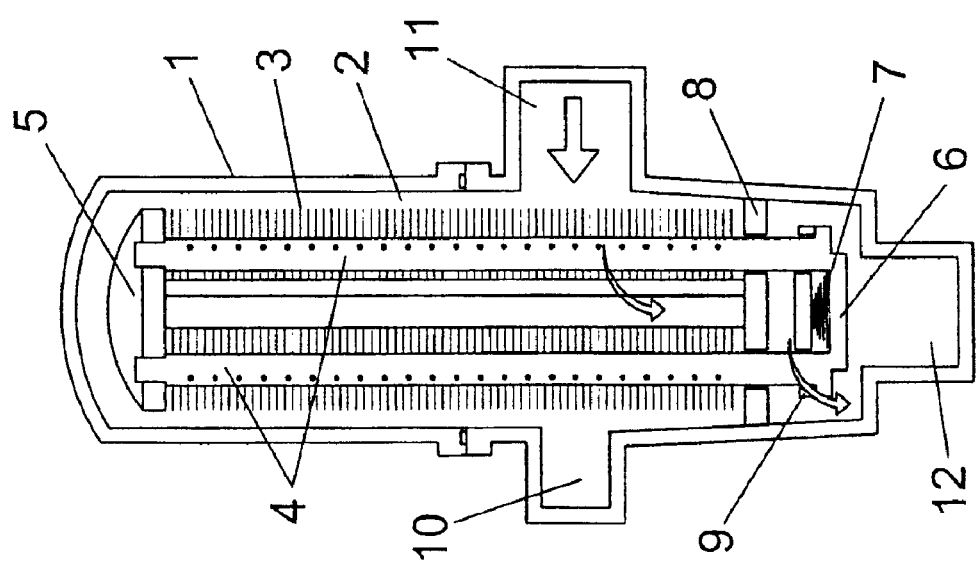
FIG. 6 shows a sectioned view in the same position as the object shown in FIG. 5.

In view of these figures, it can be seen how the improved self-cleaning filter for agricultural irrigation water has cylindrical casing (1) having an inner hollow or outer dirty water chamber (2) to which an opening or inlet (11) for water to be treated is radially coupled to, and axially coupled opening (12) for the outlet of the filtered water, a cover duly secured by a metal clamp or the like being built in the casing (1). Opening (12) acts as an outlet in the filtering position (FIGS. 3 and 4) and as an inlet in the cleaning position (FIGS. 5 and 6).

Inside the casing (1) there is a cartridge assembly (3) formed by an assembly of grooved rings (3') pressed axially against each other, and cartridge (3) is what internally defines in the casing (1) two chambers, an outer dirty water chamber (2) and another inner filtered water chamber (2').

In the filtering condition or situation, water enters through the inlet (11), passing through the pressed rings (3'), the particles reaming therein, and the clean water passing into the inner chamber (2'), exiting through the axial opening (12).

In the self-cleaning condition, the flow is reversed, entering through axial opening (12) and leaving through what was dirty water inlet (11) initially, and in this reversal of the flow the mechanisms separating the rings act and reduce the flow, allowing entrance only through perforated pipes acting on said rings (3'), making them rotate at the same time due to their pressure jets, cleaning them.

The invention incorporates an upper cover or base (5) located on the assembly of rings (3') forming the filtering cartridge (3) and a support base (8), as well as a spring (7).

The filter has an additional radial opening communicated with outer chamber (2), which will be used as the outlet (10) for the water during the cleaning operation. Since the flow is reversed, said flow will exit through outlet (10), allowing complete independence of dirty water inlet (11) from outlet (10) for the water coming for the cleaning operation. The filter reaches a higher flow rate in the cleaning at the start, eliminating the larger particles and not separating the rings (3') until the total closure of the dirty water to be filtered entering through inlet (11). After a given time period, inlet (11) is closed and the dirty water then enters through opening (12), which is when rings (3') are forced to separate. When again passing to the filtering state, outlet (10) for cleaning is closed, managing to press the rings (3'), and when rings (3') are in this situation, inlet (11) for water to be filtered is opened and opening (12) acts as an outlet, as seen in FIG. 3.

The cartridge (3) is formed by four round bases (5), (6), (8) and (9), and four perforated pipes (4) with perforations (4"), as well as a spring (7) and a regulating screw.

The pipes pass through the lower base (9) through four through openings (9'), with freedom of movements, having the spring (7) located at the lower base (9) and the circular or round base (6), and exerting pressure according to the direction of the flow, managing to change the position of the rings (3'), with pressure and decompression.

The lower part of the pipes (4) passes through support base (8) by means of through holes (8') that are larger than the diameter of the pipes (4) for the purpose of obtaining free movement. Pipes (4) end mounted to round base (6) with pipe orifices (4') free to permit water to enter into pipes (4), as seen in FIG. 6. Support base (8) includes central aperture (8") that coacts with lower base (9).

What is claimed is:

1. A self cleaning filter for agricultural irrigation water, comprising:

A) a substantially cylindrical casing (1) with an internal surface and having first and second ends, an inlet (11), first outlet (10), and second outlet (12), said inlet (11) and said first outlet (10) being radially connected to said casing (1) and said second outlet (12) being axially disposed on said first end;

B) a cartridge assembly (3) including a plurality of stacked rings (3'), each ring (3') having a central through opening, said cartridge assembly (3) being coaxially disposed within said casing defining an outer annular chamber between said rings (3') and said internal surface and an inner chamber (2') inside said central through opening;

C) at least one elongated pipe (4) having a plurality of perforations (4");

D) a support base is mounted at a cooperative location below said inlet and first outlet and supporting said cartridge assembly and further including at least one through hole (8') to permit said at least one pipe (4) to freely pass through;

E) an upper cover (5) mounted to said third open ends closing said third open ends;

F) an end round base (6) for generating the axial thrust required to separate said rings; and G) a spring loaded lower base (9) movable between cleaning and filtering positions, in said filtering position said lower base (9) being separated from said support base (8) to permit the water from a source of pressurized water connected to said inlet to pass through said outer annular chamber (2) and between said rings (3') into said inner chamber (2') and down to said second outlet (12), and in said cleaning position when said inlet (11) is selectively closed and said first outlet (10) opened, said spring loaded lower base (9) comes in abutting relationship with said support base (8), said base (9) further including at least one through opening (9') for each of said at least one elongated pipe (4), thereby forcing the water to backflow through said fourth open ends of said at least one pipe, passing out through said perforations and rings (3') so that any debris entrained between said discs is removed and pushed radially outwardly to said outer annular chamber and subsequently through said first outlet (10).

2. The filter set forth in claim 1 wherein each of said rings (3') include a plurality of small channels for spacing apart contiguous rings (3') to permit the water through.

3. The filter set forth in claim 2 wherein the spacing of said rings (3') is selectively varied.

* * * * *